(12) United States Patent
Patel

(10) Patent No.: US 8,852,157 B2
(45) Date of Patent: Oct. 7, 2014

(54) DISPOSABLE ITEMS MADE FROM BIOPLASTIC RESINS

(75) Inventor: Shantu Patel, Carlsbad, CA (US)

(73) Assignee: Innovative Bottles, LLC, Carlsbad, CA (US)

( * ) Notice: Subject to any disclaimer, the term of this patent is extended or adjusted under 35 U.S.C. 154(b) by 41 days.

(21) Appl. No.: 13/590,377

(22) Filed: Aug. 21, 2012

(65) Prior Publication Data

US 2012/0315688 A1 Dec. 13, 2012

Related U.S. Application Data

(63) Continuation-in-part of application No. PCT/US2010/060794, filed on Dec. 16, 2010, which is a continuation-in-part of application No. PCT/US2010/031887, filed on Apr. 21, 2010, and a continuation-in-part of application No. 12/709,496, filed on Feb. 21, 2010, now Pat. No. 8,519,018, and a continuation-in-part of application No. PCT/US2011/022316, filed on Jan. 25, 2011.

(51) Int. Cl.
| | |
|---|---|
| *A61M 5/00* | (2006.01) |
| *A61M 5/178* | (2006.01) |
| *B65D 1/02* | (2006.01) |
| *C08F 222/10* | (2006.01) |

(52) U.S. Cl.
CPC ......... B65D 1/0215 (2013.01); *C08F 222/1006* (2013.01)
USPC ............ 604/187; 604/19; 604/48; 604/93.01; 604/181; 604/218; 604/246; 523/124; 523/125; 523/128; 435/262; 435/262.5

(58) Field of Classification Search
USPC ............... 523/124, 128, 125, 9, 14; 435/262, 435/262.5; 604/19, 48, 93.01, 181, 187, 604/218, 246
See application file for complete search history.

(56) References Cited

U.S. PATENT DOCUMENTS

| | | | |
|---|---|---|---|
| 6,419,729 B1 * | 7/2002 | Duffy et al. ...................... | 96/17 |
| 2007/0043148 A1 | 2/2007 | Yi | |
| 2008/0188597 A1 | 8/2008 | Moriyama | |
| 2008/0213209 A1 * | 9/2008 | Kanazawa et al. ......... | 424/78.31 |
| 2009/0220545 A1 | 9/2009 | Del Giudice | |
| 2009/0246250 A1 * | 10/2009 | Orgambide et al. .......... | 424/423 |
| 2009/0246544 A1 | 10/2009 | Narita | |
| 2010/0015200 A1 * | 1/2010 | McClain et al. .............. | 424/423 |
| 2010/0282623 A1 * | 11/2010 | Reshamwala ................. | 206/210 |

FOREIGN PATENT DOCUMENTS

| | | | |
|---|---|---|---|
| JP | 2004277682 A | * | 10/2004 |
| WO | 2007130402 | | 11/2007 |

* cited by examiner

*Primary Examiner* — Sanza McClendon
(74) *Attorney, Agent, or Firm* — Larry E. Severin

(57) ABSTRACT

Disposable items made from bioplastic resins include a biodegradable resin; and a plasticizer; wherein the resin and plasticizer are intermixed to provide a generally homogenous bioplastic that is formed to provide the device. A disposable device includes a multidose syringe, a specimen tube, a scalpel, a lancet, a sharps container, or a suction canister. A method of disposing of an item includes providing an item made from a biodegradable resin and a plasticizer that are intermixed to provide a generally homogenous bioplastic; sterilizing the item utilizing radiation or ethylene oxide gas; shredding the item; and composting the item into a compost end product, thereby disposing of the item.

19 Claims, 7 Drawing Sheets

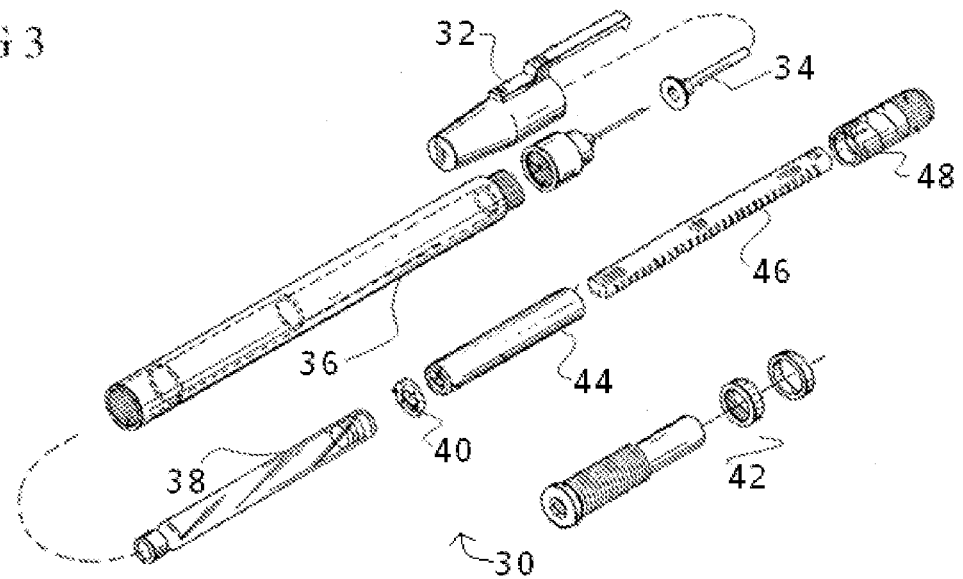
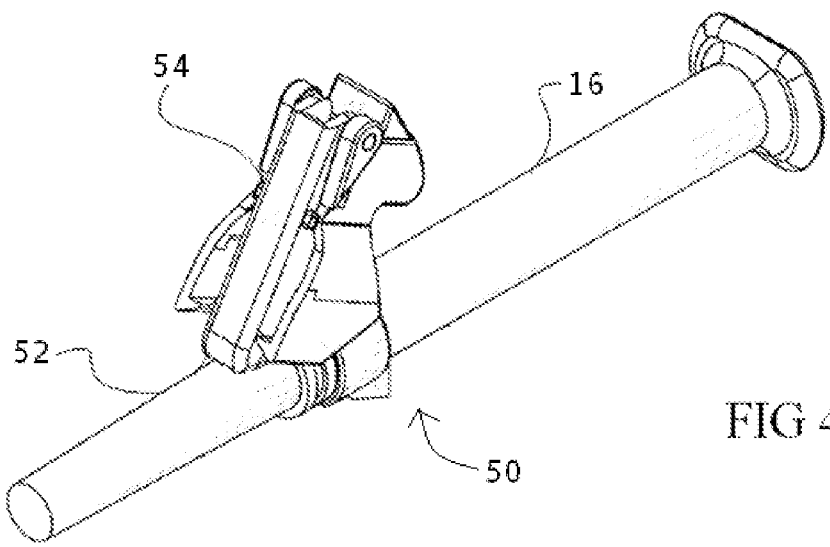

140

142

DISPOSABLE ITEMS MADE FROM BIOPLASTIC RESINS

RELATED APPLICATIONS

This application claims the benefit of the filing date of U.S. patent application Ser. No. 12/603,395, filed Oct. 21, 2009, which is incorporated herein by reference in its entirety, U.S. patent application Ser. No. 12/709,496, filed Feb. 21, 2010, which is incorporated herein by reference in its entirety, International Patent Application Number PCT/US2010/031887, filed Apr. 21, 2010, which is incorporated herein by reference in its entirety, International Patent Application Number PCT/US2010/060794, filed Dec. 16, 2010, which is incorporated herein by reference in its entirety, and International Patent Application Number PCT/US2011/022316, filed Jan. 25, 2011, which is incorporated herein by reference in its entirety.

BACKGROUND OF THE INVENTION

The present invention generally relates to disposable, biodegradable items and more specifically to disposable items made from bioplastic resins.

Environment and sustainability have become increasingly important factors in the design and specification of medical and printing articles across the world. In hospitals, pharmaceuticals, life sciences, and healthcare industries, safe disposal of articles after use is an important issue. Special considerations are given to selecting materials in the final design for disposable articles, so as to reduce the quantity of medical and printing items that enter waste streams. These facilities and industries must initiate environmentally safe disposal methods because they generate a large amount of the biomedical and printing waste. Due to higher social responsibility and environmental concerns, corporations are being driven to produce more sustainable and environmentally safe products through government regulations, by institutional investors, and through consumer demand.

Bioplastic resins namely, polylactic acid (PLA), and polyhydroxyalkonate (PHA), are derived from a plant source, and are biodegradable.

Polylactic acid (PLA) is a transparent bioplastic produced from corn, beet and cane sugar. It not only resembles conventional petrochemical mass plastics, such as polyethylene (PE), polyethylene terephthalate (PET or PETE), and polypropylene (PP) in its characteristics, but it can also be processed easily on standard equipment that already exists for the production of conventional plastics. PLA has a density of 1.25 to 3 g cm, which is lower than PET, and PLA has a refractive index of 1.35-1.45, which is lower than PET, which has a refractive index of 1.54. PLA is currently used in biomedical applications, such as sutures, stents, dialysis media and drug delivery devices. It is also being evaluated as a material for tissue engineering.

The biopolymer poly-hydroxyalkonate (PHA) is a polyester produced by certain bacteria that process glucose or starch. PHA's characteristics are similar to those of the petro plastic polypropylene. The South American sugar industry, for example, has decided to expand PHA production to an industrial scale. PHA is distinguished primarily by its physical characteristics. It produces a transparent film at a melting point higher than 130 degrees Celsius, and is biodegradable without residue.

Poly3-hydoxybutrate-3-hydroxyhexxanate (PHBH) is a biodegradable resin. This co-polyester has been produced in a fermentation process using glucose and propionic acid as the carbon source for Alcaligenes eutrophus. It has mechanical and physical properties that vary based on the degree of co-polymerization. This bioplastic will undergo enzymatic biodegrading in the presence of microorganisms.

Cross-linked polymers may have problems biodegrading, since the crosslinking forms strong bonds that are resist to enzymatic biodegradation in the presence of microorganisms. Plastics are durable but degrade very slowly; the molecular bonds that make plastic are durable, making it resistant to natural processes of degradation.

Bioplastic resins have some distinct advantages over plastic and glass. Bioplastic has a much smaller carbon footprint compared to plastic or glass, and also uses less energy to form an article like a syringe, multidose syringes, specimen tube, scalpels, lancets, and sharps containers, suction canisters and ink and toner cartridges, hereby referred to as disposable medical and printing articles, DMPA. Bioplastic is biodegradable in an industrial composting unit. Bioplastic resins are from a plant source, and when plants are grown, they absorb carbon dioxide, thus decreasing carbon dioxide in the atmosphere. Plastic and glass disposable items have a higher carbon footprint than bioplastic items. Current DMPA, when disposed of, enter the waste stream, and may need incineration in a process that causes release of hydrocarbons and toxins into the atmosphere and creates fly ash that ends up in landfills. Bioplastic articles bypass this process, and are therefore environmentally safe and sustainable, when compared to plastic or glass. Bioplastic, however, has poor permeability characteristics, in reference to water, oxygen and carbon dioxide. Bioplastic also has poor flexibility properties, and PLA has poor thermal properties, with heat distortion threshold of 55 Celsius, compared to plastics.

Used disposable syringes, multidose syringes, specimen tubes, and cartridges, scalpels and sharps containers, suction canisters may be referred to as disposable medical & printing articles (or DMPA). DMPA create a biomedical waste stream. Unfortunately, there are no easy, non-polluting methods that destroy used DMPA. Decontamination of DMPA removes pathogens from body secretions or blood, attached to them. However, once the sterile DMPA are shredded and placed in landfills, it will be contaminated by other germs. People who step on the needles will remain at risk for injury and other infections. The other least popular option that destroys the DMPA after disposal is incineration or burning. DMPA, made of polypropylene, cyclic olefin polymers or plastic material when incinerated or burned, cause release of hydrocarbon, carbon dioxide, carbon monoxide and airborne toxins, and is not environmentally safe.

Bioplastic or bioplastics are from a renewable source, and are sustainable for they have a small carbon footprint. Current plastic and glass DMPA, when disposed of, enters the medical waste stream and creates a negative environmental impact. DMPA during incineration causes release of hydrocarbons and toxins into the atmosphere and create fly ash that ends up in landfills. When DMPA made from bioplastic enters the biomedical waste stream it can be sterilized using steam, radiation (UV or gamma) or ethylene oxide gas, then shredded and placed in an industrial composting unit. This method is referred to as Bio medical and printing waste Sterilization and Composting Process, (or BSCP), which avoids incineration. The compost end product has few negative impacts on the environment. One can also opt to collect the sterile bioplastic shredded material to recycle and reclaim the resin. The whole process is cradle to cradle and uses less energy thereby offering a sustainable and environmentally safe method of manufacturing and disposing DMPA.

Diabetics and others frequently have to take a parental medication or an injection. They find themselves in situations where the assistance of a health care professional to administer the subcutaneous or intramuscular injection of a measured amount of a liquid agent is generally not available. In such situations such persons need to have a low cost multi dose syringe that does not require the assistance of a health professional to achieve the desired measure of accuracy. It may be the case that such persons require more than one dose per day, where each dose may require a different volume.

In hospitals, pharmaceuticals, life sciences and health industries, ever increasing attention is being paid to needle stick problems due to the contemporary sensitivity of exposure to AIDS, hepatitis, and other serious blood-borne diseases. This is prevented by the use of safety needle caps and shields.

Existing specimen tubes for storing blood are currently made commonly from plastics and glass, which are not sustainable or environmentally safe.

Lancets may be commonly used in the treatment of diabetes. The small blood samples obtained may be tested for blood glucose, hemoglobin, make blood smear slides, allergy skin tests and many other blood tests.

Existing sharps containers are filled with used medical needles or other sharp medical sharp instruments, such as suture needles, IV catheters and scalpels. They fit into two main types: single-use, which are disposed of with the waste inside the container, or multi-use, which are replaced by a new container periodically. It is standard practice for used needles and other sharps to be placed immediately into a sharps container after a single use, to prevent accidental needle sticks, which can lead to blood borne diseases including HIV and hepatitis. The emotional impact of needle stick and sharp injuries can be severe and long lasting, even when a serious infection is not transmitted. The sharps and needles are dropped into the container without touching the outside of the container. Proper use of a sharps container includes pickup by or delivery to an approved "red bag" or medical waste treatment site. In addition to this pre-existing safety measure, U.S. medical and educational staff is federally required to be tested on their knowledge of blood borne pathogens. During the last ten years, increased worldwide focus on safety and environmental impact has led to several positive government mandates being issued regarding engineered medical device standards and the reduction of clinical waste output from health facilities.

Suction canisters are extensively used in hospitals when it is necessary to create suction. In surgery, suction can be used to remove blood from the area being operated on to allow surgeons to view and work on the area. Suction may be used to clear the airway of blood, saliva, vomit, or other secretions so that a patient may breathe. Suctioning can prevent pulmonary aspiration, which can lead to lung infections. In pulmonary toilet, suction is used to remove fluids from the airways, to facilitate breathing and prevent growth of microorganisms. Suction devices may be mechanical hand pumps or battery or electrically operated mechanisms.

Current ink and toner cartridges are made from plastic material. An ink or inkjet cartridge is a replaceable component of a printer that contains the ink. Each ink cartridge contains one or more partitioned ink reservoirs; certain manufacturers also add electronic contacts and a chip that communicates with the printer. A toner cartridge, also called laser toner, is the consumable component of a laser printer or copy machine. Toner cartridges contain toner powder, a fine, dry mixture of plastic particles, carbon, and black or other coloring agents that make the actual image on the paper. The toner is transferred to paper via an electro statically charged drum unit, and fused onto the paper by heated rollers during the printing process. Some toner cartridges incorporate the drum unit in the cartridge and therefore replacing the toner cartridge means replacing the drum unit.

It would be desirable to provide bioplastic syringes with the needle caps and needle safety shields, multidose syringes, specimen tubes, scalpels, lancets, sharp disposal containers, suction canisters, printer and copy machine ink and toner cartridges, and methods for environmentally safe disposal of these items.

SUMMARY OF THE INVENTION

In one aspect of the present invention, a disposable device includes a biodegradable resin; and a plasticizer; wherein the resin and plasticizer are intermixed to provide a generally homogenous bioplastic that is formed to provide the device.

In another aspect of the present invention, a method of disposing of an item includes providing an item made from a biodegradable resin and a plasticizer that are intermixed to provide a generally homogenous bioplastic; sterilizing the item utilizing radiation or ethylene oxide gas; shredding the item; and composting the item into a compost end product, thereby disposing of the item.

BRIEF DESCRIPTION OF THE DRAWINGS

FIG. 3 depicts an embodiment of a multi dose syringe and assembly according to the present invention;

FIG. 4 depicts an embodiment of a safety needle cap and shield according to the present invention;

DETAILED DESCRIPTION

The preferred embodiment and other embodiments, which can be used in industry and include the best mode now known of carrying out the invention, are hereby described in detail with reference to the drawings. Further embodiments, features and advantages will become apparent from the ensuing description, or may be learned without undue experimentation. The figures are not necessarily drawn to scale, except where otherwise indicated. The following description of embodiments, even if phrased in terms of "the invention" or what the embodiment "is," is not to be taken in a limiting sense, but describes the manner and process of making and using the invention. The coverage of this patent will be described in the claims. The order in which steps are listed in the claims does not necessarily indicate that the steps must be performed in that order.

Embodiments of the present invention generally provide disposable syringes, multidose syringes, specimen tubes, scalpels, lancets, sharps containers, and suction canisters made from sustainable and environmentally safe bioplastic resins. Embodiments also provide ink and toner cartridges items from sustainable and environmentally safe bioplastic resins.

Embodiments of disposable plastic articles may be used in hospitals, pharmaceuticals, life sciences, and healthcare industries. Embodiments may be made from sustainable, environmentally friendly bioplastic resins and may be safely disposed without further environmental impact. Embodiments of disposable articles may be made from biodegradable resin, including polylactic polymer (PLA), polyhydroxyalkonate (PHA), or poly 3 hydroxybutrate co 3 hydroxyhexanote (PHBH). In an embodiment of the present invention, plasticizers may used to overcome permeability, stability, flexibility and thermal issues for these biodegradable resins.

Cross-linked polymers may have problems biodegrading, since the cross-linking forms strong chemical bonds. Instead of cross-linking, embodiments of the present invention may have a low cross-linking density. The biodegradable resin and plasticizer may be mixed, extruded as a bioplastic, and will form thermal bonds without chemical curing. Embodiments may have no additives or agents for cross-linking so that the bioplastic will biodegrade, yet have sufficient stability and flexibility for disposable medical and printing articles. Instead, the resin and plasticizer are intermixed to provide a generally homogenous bioplastic that is formed to provide the disposable device. Such items can be sterilized using low-temperature methods such as radiation or ethylene oxide gas, to avoid melting the bioplastic.

Figure 1:
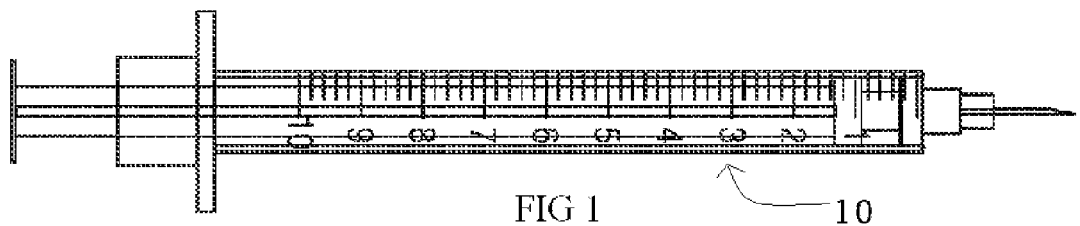
FIG. 1 depicts an embodiment of a syringe with attached needle according to the present invention.

FIG. 1 depicts an embodiment of a bioplastic syringe 10 with attached needle. Embodiments of bioplastic syringes may be used for insulin administration, allergy or tuberculin testing or administration of other parental agents. An embodiment of a syringe 10 may be made from bioplastic, and may have a simple piston pump with a plunger that fits tightly in a tube. The plunger may be pulled and pushed along inside a cylindrical tube (the barrel), allowing the syringe to take in and expel a liquid or gas through an orifice at the open end of the tube. The open end of the syringe may be fitted with a hypodermic needle, a nozzle, or tubing to help direct the flow into and out of the barrel. Embodiments of bioplastic syringes may be used in the medical field to administer injections, insulin administration, skin tests such as allergy tests, and tuberculin testing. In non-medical field uses, non-sterile bioplastic syringes may be used to apply compounds such as glue or lubricant, and measure liquids.

Figure 2:
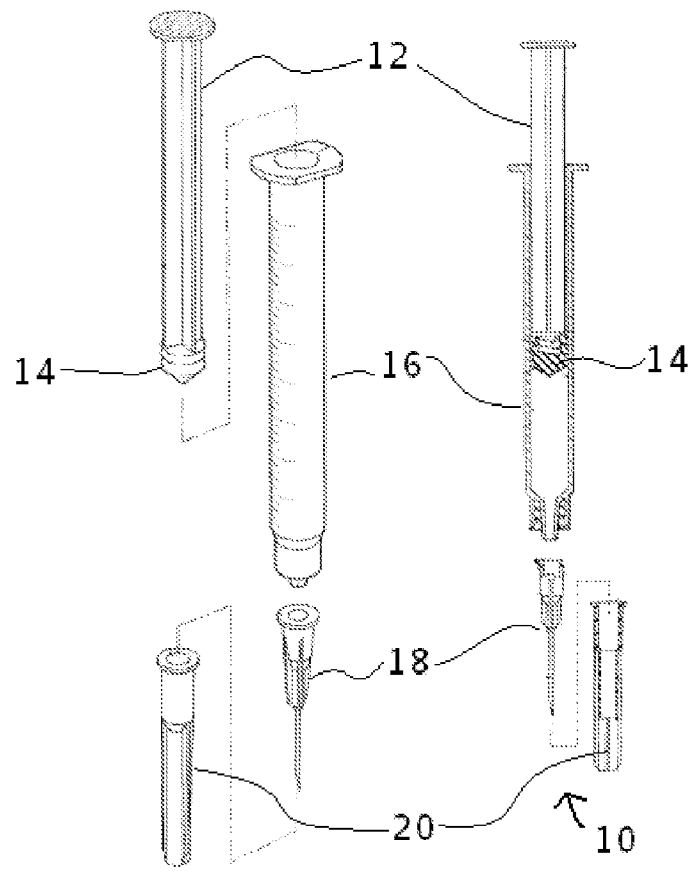
FIG. 2 depicts an embodiment of a general purpose syringe and assembly according to the present invention.

FIG. 2 depicts perspective and in cross section views of a general propose disposable single-use syringe 10 that may have a plunger 12 with a rubber tip 14, a cylindrical barrel 16, a hypodermic needle 18 and a needle cap 20. Plunger 12, barrel 16 and needle cap 20 may include or be made from bioplastic resin.

FIG. 3 depicts an embodiment of a multidose syringe assembly 30 or dispenser that may have a pen cap 32, a needle cap 34, a housing cylinder 36, a collar 40, and collar assembly 42, cylinder tube 44, piston plunger 46 and a numerically calibrated cap 48, all of which may include or be made from bioplastic resin. Housing cylinder 36 holds a prefilled vial 38 that contains fluid. An embodiment of a syringe assembly 30 or dispenser may have the general appearance of a pen. A pen-like dispenser may be large enough to hold several doses, yet be small enough to fit conveniently in a user's pocket or purse, such as, for example, from 5½ " long to 7" long, An embodiment of a pen-like dispenser may include several parts all made from bioplastic, perhaps other than a prefilled vial that holds the liquid agent.

FIG. 4 depicts an embodiment of a safety needle cap and shield assembly 50, which may include a needle cap 52 and a needle safety shield 54 attached to the syringe cylindrical barrel 16, all of which may include or be made from bioplastic resin. An embodiment of a syringe needle assembly may include a syringe fixed to a medical or hypodermic needle. An embodiment of a bioplastic cap and a safety shield assembly 50 may attach to the syringe needle assembly, to help provide protection from a sharpened tip of the needle. The cap 52 may be removed before using the syringe needle assembly. After using the syringe needle assembly, the safety shield 54 may be deployed. The safety shield 54 may be foldable or may include a tubular assembly, thereby providing a safety sheath for the needle. This may help guard against problems associated with inadvertent needle sticks related to blood sampling, percutaneous medication injection and other medical procedures involving uses of medical needles.

Figure 5:
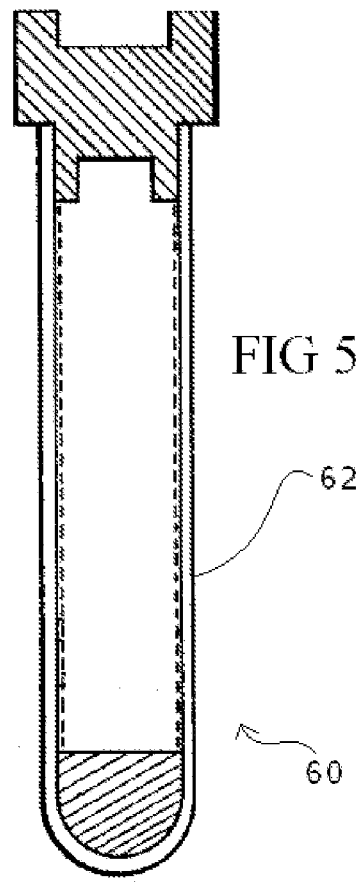
FIG. 5 depicts an embodiment of a specimen tube according to the present invention.

FIG. 5 depicts an embodiment of a blood specimen tube 60. The tube 60 may have walls 62 adapted to contain blood, which may include a bioplastic resin.

Figure 6:
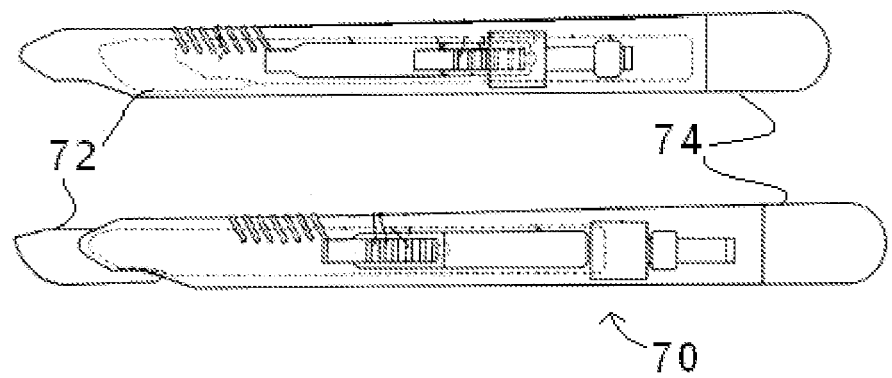
FIG. 6 depicts an embodiment of a scalpel handle and blade according to the present invention.

FIG. 6 depicts an embodiment of a scalpel 70, which may include a blade 72 in a retractable safety handle 74. Handle 74 may include a bioplastic resin. An embodiment of a scalpel may be a small and extremely sharp bladed instrument used for surgery, anatomical dissection, and various arts and crafts. Embodiments of scalpels may be disposable and single-use, with a safety retractable blade that can be retracted and extended in and out of a bioplastic handle.

Figure 7:
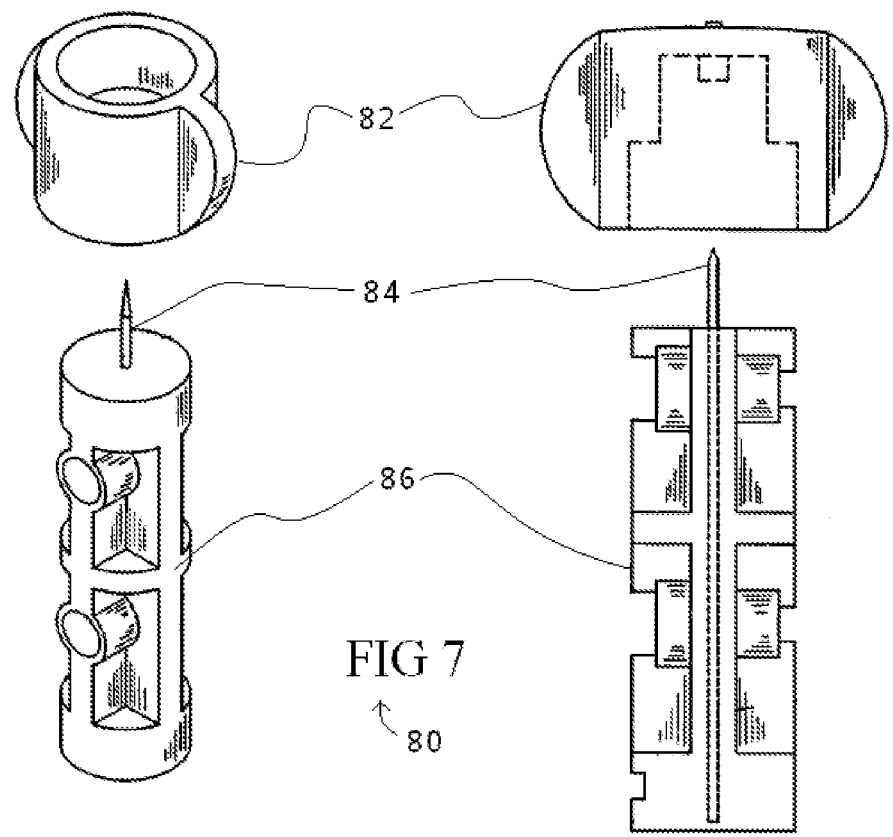
FIG. 7 depicts an embodiment of a lancet and cross section according to the present invention.

FIG. 7 depicts an embodiment of a lancet 80, which may include a safety cap 82, a needle with a piercing tip 84, and a body 86. Safety cap 82 and body 86 may include bioplastic resin. An embodiment of a disposable lancet 80 may be used to make punctures to obtain small blood specimens. An embodiment of a lancing device may be a reusable instrument equipped with a bioplastic lancet 80.

Figure 8:
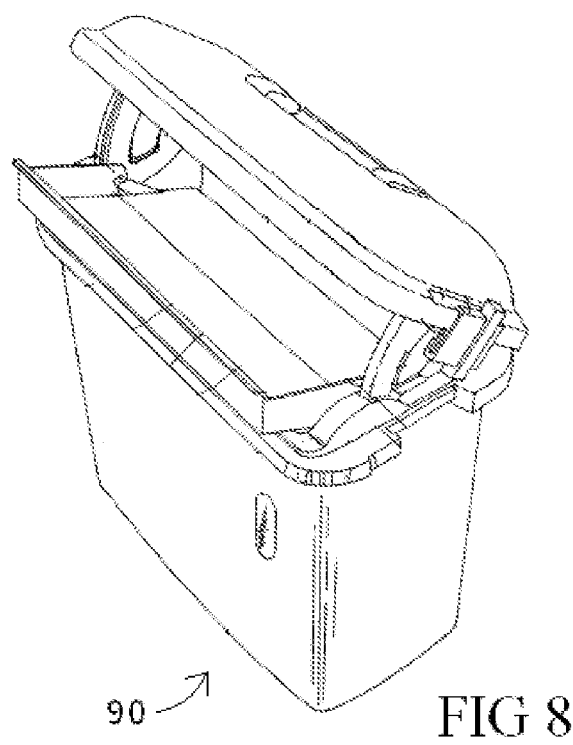
FIG. 8 depicts an embodiment of a sharps container according to the present invention.

FIG. 8 depicts an embodiment of a sharps container 90, which may include or be made from bioplastic resin.

Figure 9:
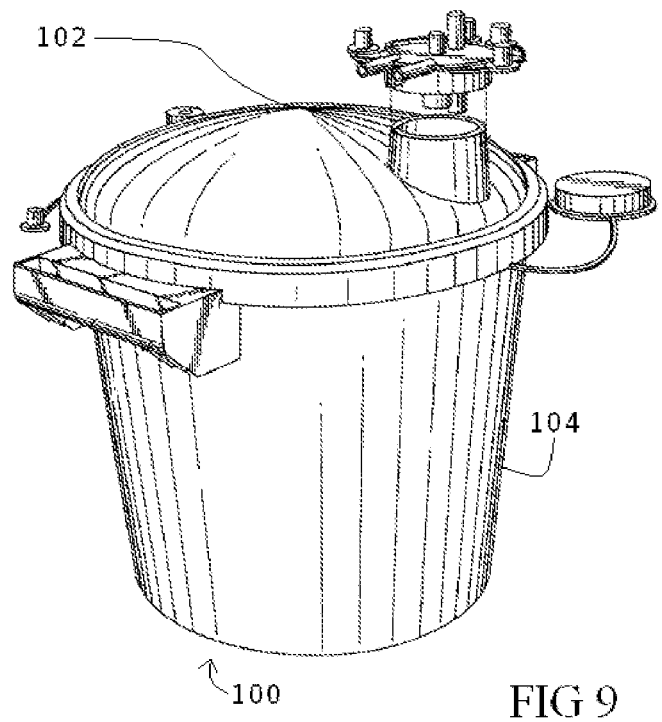
FIG. 9 depicts an embodiment of a suction canister with a broad neck according to the present invention.
Figure 10:
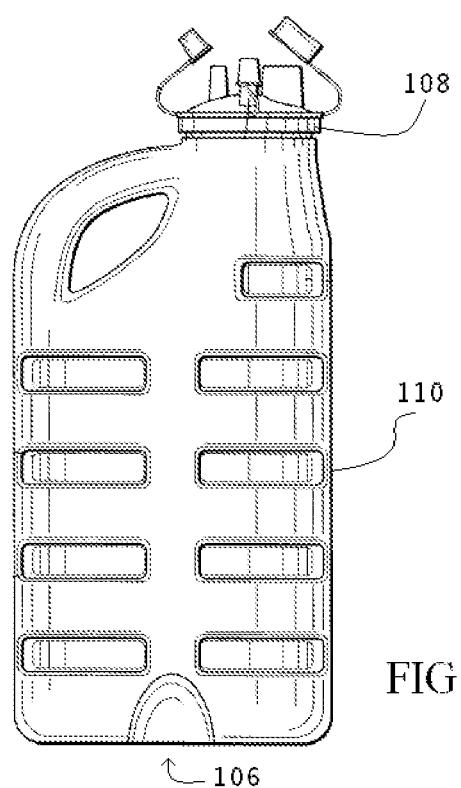
FIG. 10 depicts an embodiment of a suction canister with a narrow neck according to the present invention.

FIG. 9 depicts an embodiment of a broad neck suction canister assembly 100 with a cap 102 and broad neck receptacle 104. FIG. 10 depicts an embodiment of a narrow neck suction canister assembly 106 with a cap 108 and narrow neck receptacle 110. The caps 102, 108 and receptacles 104, 110 may include or be made from bioplastic resin.

Figure 11:
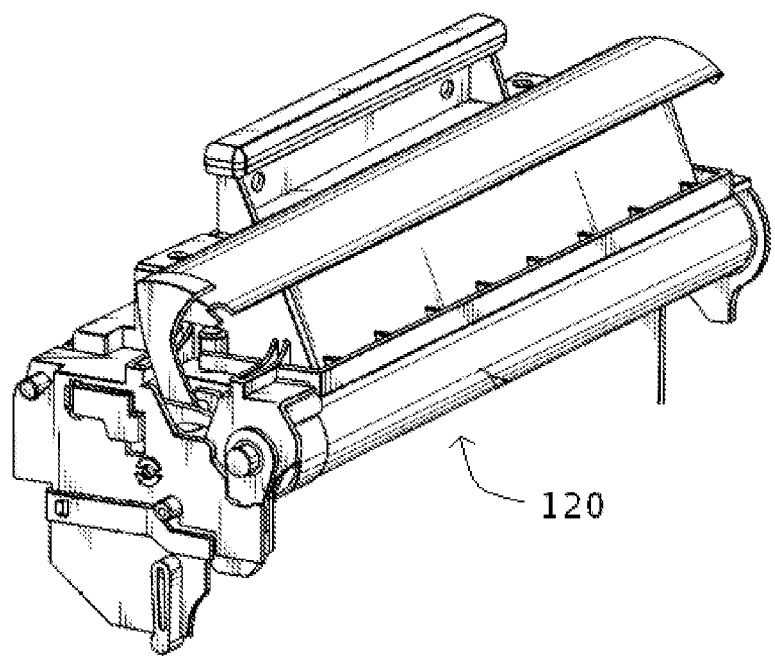
FIG. 11 depicts a perspective view an embodiment of a toner cartridge with drum according to the present invention.
Figure 12:
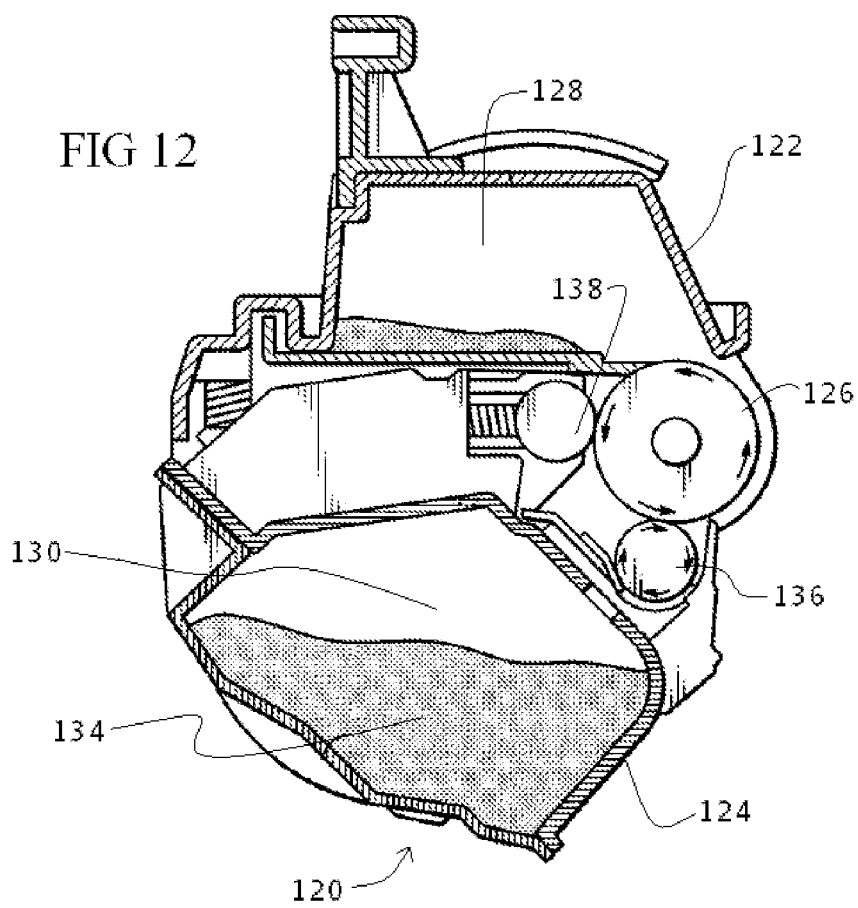
FIG. 12 depicts a cross section of the embodiment of FIG. 11.

FIGS. 11 and 12 depict an embodiment of a toner cartridge 120. Toner cartridge 120 may include a first casing part 122 and a second casing part 124, which are separable from each other. First casing part 122 may have a photosensitive drum 126 that retains an electrostatic latent image on its surface and a waste toner unit 128 that removes and collects toner remaining on the surface of photosensitive drum 126. Second casing part 124 may have a toner hopper 130 that contains toner 134, a magnet roller 136 that supplies toner from toner hopper 130 to photosensitive drum 126, and which develops the electrostatic latent image and charging roller 138 that uniformly charges the surface of photosensitive drum 126. Toner cartridge 120 may be assembled from first part 122 and second part 124. Toner cartridge 120, first casing part 122, and second casing part 124 may include or be made from bioplastic resin.

Figure 13:
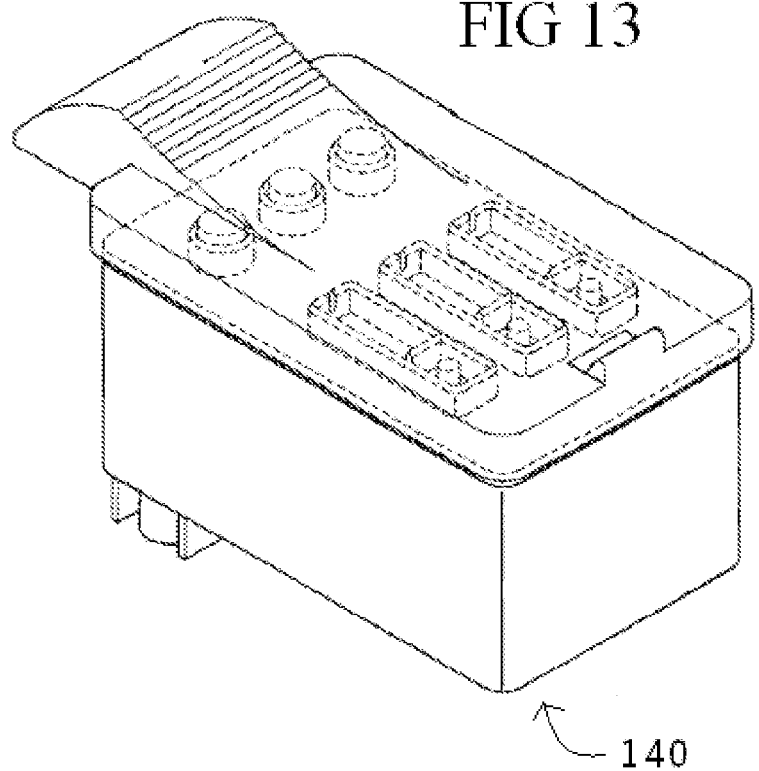
FIG. 13 depicts an embodiment of a ink cartridge with a single reservoir according to the present invention.
Figure 14:
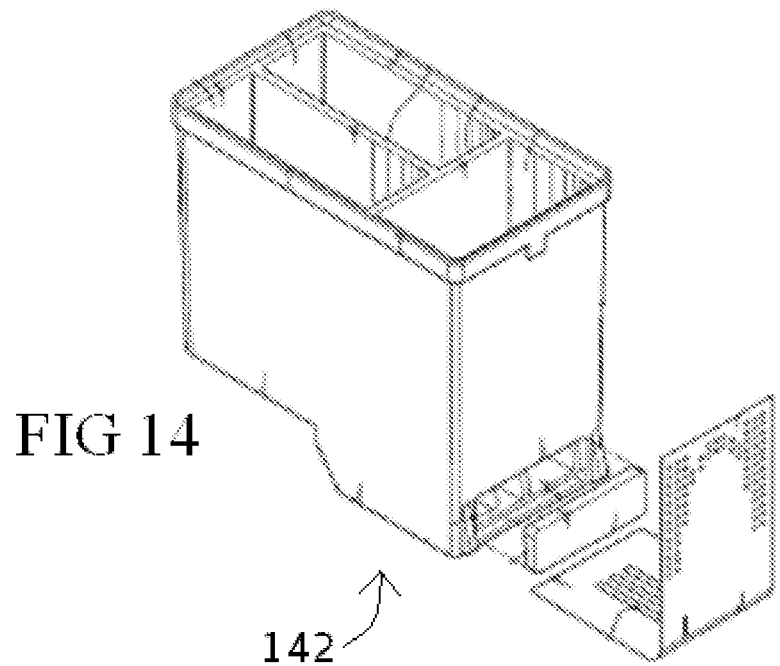
FIG. 14 depicts an embodiment of a ink cartridge with multiple reservoirs according to the present invention.

FIG. 13 depicts an embodiment of an ink cartridge with a single reservoir 140. FIG. 14 depicts an embodiment of an ink cartridge with multiple reservoirs 142. Embodiments of bioplastic ink and toner reservoirs may be used in printer and copy machines. Ink reservoirs 140 and 142 may include or be made from bioplastic resin and may be attached to a base that can include electronic, plastic, or bioplastic parts or materials.

The embodiments described are not intended to be limited to the pictured shapes, sizes and orientations.

I claim:

1. A disposable device comprising:
   a biodegradable resin; and
   a plasticizer;
   wherein the resin and plasticizer are intermixed to provide a generally homogenous bioplastic that is formed to provide the device; and
   the device is at least one of a multidose syringe, a sharps container, or a suction canister.

2. The device of claim 1, wherein the bioplastic is formed and thermally bonded in the absence of cross-linking agents.

3. The device of claim 1, wherein the bioplastic in the device has a low cross-linking density, thereby providing a generally biodegradable disposable device.

4. The device of claim 1, wherein the device is a sharps container.

5. The device of claim 1, wherein the device is a biodegradable suction canister.

6. The device of claim 1, wherein the biodegradable resin is Polylactic Acid (PLA).

7. The device of claim 1, wherein the biodegradable resin is polyhydroxyalkonate (PHA).

8. The device of claim 1, wherein the biodegradable resin is poly 3 hydroxybutrate co 3 hydroxyhexanote (PHBH).

9. A method of disposing of an item, comprising:
   providing an item made from a biodegradable resin and a plasticizer that are intermixed to provide a generally homogenous bioplastic;
   sterilizing the item utilizing radiation or ethylene oxide gas;
   shredding the item; and
   composting the item into a compost end product, thereby disposing of the item.

10. The method of claim 9, wherein the item is a multidose syringe, a sharps container, or a suction canister.

11. The method of claim 9, wherein the bioplastic includes Polylactic Acid (PLA).

12. The method of claim 9, wherein the bioplastic includes polyhydroxyalkonate (PHA).

13. The method of claim 9, wherein the bioplastic includes poly 3 hydroxybutrate co 3 hydroxyhexanote (PHBH).

14. The device of claim 1, wherein the device is a disposable multidose syringe further comprising:
    a piston plunger that slides within the syringe; and
    an adjustable cap that presses against the plunger to urge the plunger to slide and also adjustably limits the distance the plunger can slide within the syringe, thereby delivering a measured dose of material out of the syringe.

15. The device of claim 1, wherein the device is a multidose syringe adapted to utilize a replaceable, prefilled vial that is large enough to hold several doses, the syringe further comprising means to repeatedly deliver a single dose at a time from the vial.

16. The device of claim 1, wherein the device is a multidose syringe with an adjustable cap that screws onto a piston plunger and limits the distance the piston plunger moves against a prefilled vial, thereby delivering a measured dose from the prefilled vial.

17. The method of claim 9, wherein the item is a multidose syringe that utilizes a prefilled vial, comprising:
    a biodegradable resin;
    a plasticizer;
    a piston plunger; and
    a calibrated cap;
    wherein the resin and plasticizer are intermixed to provide a generally homogenous bioplastic that is formed to provide the syringe; and
    the calibrated cap limits the movement of the piston plunger;
    so that the syringe thereby delivers multiple, measured doses of material from the vial.

18. A multidose syringe that utilizes a prefilled vial, comprising:
    a biodegradable resin;
    a plasticizer;
    a piston plunger; and
    a calibrated cap;
    wherein the resin and plasticizer are intermixed to provide a generally homogenous bioplastic that is formed to provide the syringe; and
    the calibrated cap limits the movement of the piston plunger;
    so that the syringe thereby delivers multiple, measured doses of material from the vial.

19. The method of claim 18, wherein the bioplastic includes polyhydroxyalkonate (PHA).

* * * * *